(12) United States Patent
Mikkilineni et al.

(10) Patent No.: US 10,031,750 B2
(45) Date of Patent: *Jul. 24, 2018

(54) APPARATUS AND METHODS FOR COGNITIVE CONTAINTERS TO OPTIMIZE MANAGED COMPUTATIONS AND COMPUTING RESOURCES

(71) Applicants: Rao V. Mikkilineni, Cupertino, CA (US); Surendra Keshan, Cupertino, CA (US); Giovanni Morana, Mountain View, CA (US)

(72) Inventors: Rao V. Mikkilineni, Cupertino, CA (US); Surendra Keshan, Cupertino, CA (US); Giovanni Morana, Mountain View, CA (US)

(73) Assignee: C3DNA INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,485

(22) Filed: Dec. 30, 2015

(65) Prior Publication Data

US 2016/0110192 A1    Apr. 21, 2016

Related U.S. Application Data

(63) Continuation-in-part of application No. 14/612,113, filed on Feb. 2, 2015, now Pat. No. 9,235,432, which
(Continued)

(51) Int. Cl.
*G06F 9/46* (2006.01)
*G06F 9/30* (2018.01)
(Continued)

(52) U.S. Cl.
CPC ............... *G06F 9/30* (2013.01); *G06F 9/445* (2013.01); *G06F 11/14* (2013.01); *H04L 41/042* (2013.01); *H04L 63/102* (2013.01); *H04L 63/20* (2013.01)

(58) Field of Classification Search
None
See application file for complete search history.

(56) References Cited

U.S. PATENT DOCUMENTS

2004/0254652 A1* 12/2004 Ota ................. G08B 25/009
700/12
2008/0155643 A1* 6/2008 Moran ............... G06F 21/6218
726/1
(Continued)

*Primary Examiner* — Wissam Rashid
(74) *Attorney, Agent, or Firm* — Ascenda Law Group, PC

(57) ABSTRACT

A cognitive container includes a set of managers for monitoring and controlling a computational element based on context, constraints and computing resources available to that computational element. Collectively, the set of managers may be regarded as a service regulator that specifies the algorithm context, constraints, connections, communication abstractions and control commands which are used to monitor and control the algorithm execution at run-time. The computational element is the algorithm executable module that can be loaded and run. The managers may communicate with external agents using a signaling channel that is separate from a data path used by the computational element for inputs and outputs, thereby providing external agents the ability to influence the computation in progress.

1 Claim, 2 Drawing Sheets

Related U.S. Application Data is a continuation of application No. 12/869,510, filed on Aug. 26, 2010, now Pat. No. 8,990,290.

(60) Provisional application No. 61/239,734, filed on Sep. 3, 2009.

(51) Int. Cl.
*G06F 9/445* (2018.01)
*H04L 12/24* (2006.01)
*G06F 11/14* (2006.01)
*H04L 29/06* (2006.01)

(56) References Cited

U.S. PATENT DOCUMENTS

2009/0044185 A1* 2/2009 Krivopaltsev .......... H04L 29/06
  717/173
2009/0077175 A1 3/2009 Deanna et al.

* cited by examiner

APPARATUS AND METHODS FOR COGNITIVE CONTAINTERS TO OPTIMIZE MANAGED COMPUTATIONS AND COMPUTING RESOURCES

RELATED APPLICATIONS

This application is a CONTINUATION-IN-PART of U.S. patent application Ser. No. 14/612,113, filed 2 Feb. 2015, which is a CONTINUATION of U.S. patent application Ser. No. 12/869,510, filed 26 Aug. 2010, now U.S. Pat. No. 8,990,290, which claims priority to U.S. Provisional Application 61/239,734, filed 3 Sep. 2009, each of which is incorporated herein by reference in its respective entirety.

FIELD OF THE INVENTION

The present invention relates generally to apparatus and methods to monitor and manage applications and service transactions in a distributed computing environment.

BACKGROUND

While virtualization and "cloud computing" have brought elasticity to computing resources and agility to applications in distributed computing environments, these technologies have also increased system and application management complexities. The conventional solution to dealing with the management of distributed systems and applications contributing to distributed service transactions has been the addition of layers of orchestration and management. While virtual machines improve resiliency and provide live migration capabilities (e.g., to reduce recovery times in cases of service failures), the increased complexity of hypervisors, their orchestration, and the movement and management of virtual machine images adds additional burden in the datacenter.

At the same time, data security has become a paramount consideration for any organization that operates or relies upon a datacenter. Current approaches to solving this issue, which marry server-centric operating system security with network-centric security, have generated a web of security management systems that require shared run-time resources along with applications. This has resulted in ad-hoc, somewhat parallel implementations of application execution and application management workflows.

As the complexity of the datacenter increases, the conventional response has been to introduce more resource administration and operational controls. For example, when services cross boundaries between datacenters and clouds, they use resources that are owned and managed by different service providers. Providing visibility and control of end-to-end service thus requires interfacing and integrating various systems and processes and such approaches does not scale well. Moreover, current authentication, authorization and accounting (AAA) schemes, with their server-centric origins, are not well suited for such environments.

SUMMARY OF THE INVENTION

In various embodiments, the present invention provides a set of managers for monitoring and controlling a computational element based on context, constraints and computing resources (e.g., CPU and memory utilization, network bandwidth, external storage capacity and storage throughput) available to that computational element. The context, constraints and control options may be specified as a meta-model of the algorithm under computation. In this model, context refers to local resource utilization and the computational state obtained through the interaction with the computational element. Collectively, the set of managers, the computational element and the independent data and signaling channels used by these facilities is referred to as a cognitive container. Each cognitive container may be regarded as including two components: a service regulator that specifies the algorithm context, constraints, connections, communication abstractions and control commands which are used to monitor and control the algorithm execution at run-time; and the algorithm executable module that can be loaded and run. The managers may communicate with external agents using the signaling channel, thereby providing external agents the ability to influence the computation in progress. The external agents themselves may be other cognitive containers, in which case changes in one computing element may influence the evolution of another computing element at run time without halting its execution of the algorithm.

BRIEF DESCRIPTION OF THE DRAWINGS

The present invention is illustrated by way of example nd not limitation in the figures of the accompanying drawings, in which.

DESCRIPTION

Figure 1:
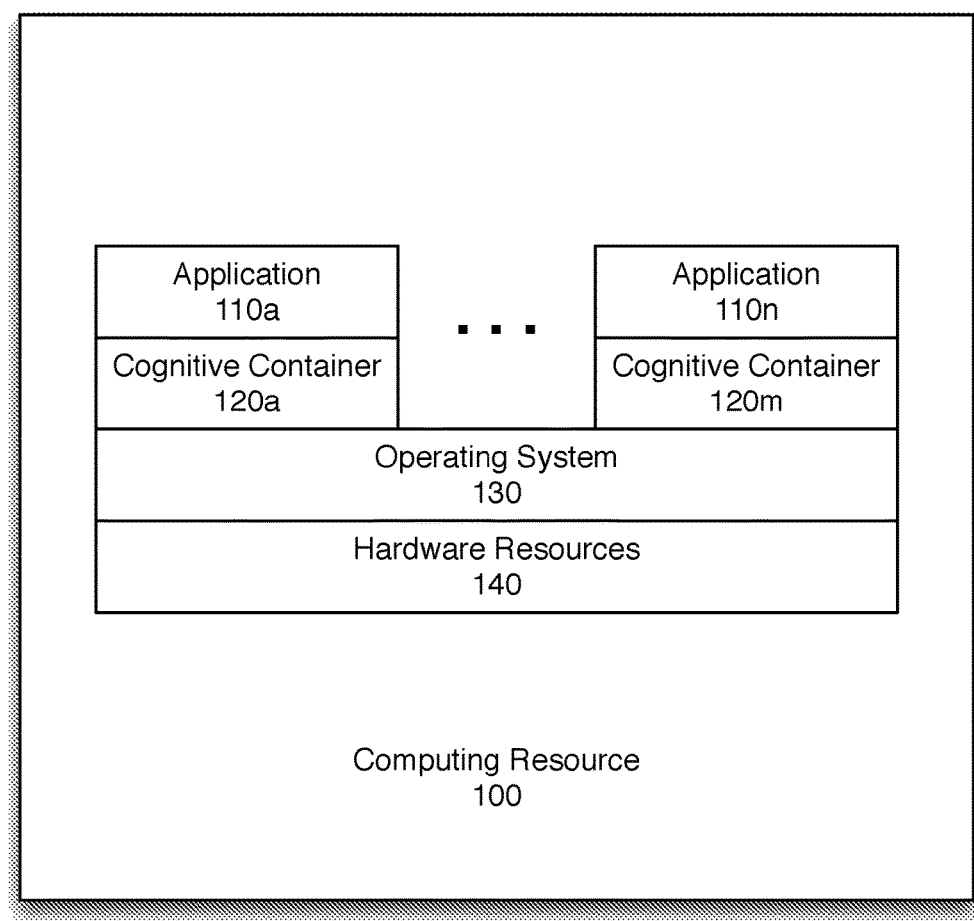
FIG. 1 illustrates an example of one or more cognitive containers infused between respective applications and an operating system that provides the resources to execute the applications at run-time according to an embodiment of the present invention.

The present inventor has recognized that the increase in the complexity of management of services and security for virtualized and cloud-based resources is a symptom, not of software design or operational execution, but rather a fundamental architectural issue related to Godel's prohibition of self-reflection in Turing machines. Cockshott et al. opined that, "The key property of general-purpose computers is that they are general purpose. We can use them to deterministically model any physical system, of which they are not themselves a part, to an arbitrary degree of accuracy. Their logical limits arise when we try to get them to model a part of the world that includes themselves." Cockshott P., MacKenzie L. M., and Michaelson, G, Computation and its Limits, Oxford University Press (2012). Therein lies the problem: Automation of dynamic resource administration at run-time makes the computer itself a part of the model and, therefore, the increase in complexity due to increased layers of management is really a manifestation of an architectural shortfall of current computing models.

The problem presents itself in a number of different application areas, including network security. Since current computing networks with connected data paths constitute a universal Turing machine, the control path and data path in such networks are not separated. Thus, vulnerabilities to security breaches cannot be controlled by mere operational workarounds or automation of such workarounds. Moreover, as groups of collaborating applications increasingly are deployed across multiple datacenters and public or private clouds, often owned and operated by different service providers and operators, service management that requires optimizing applications and their resource utilization at run-time is not scalable with more software that coordinates the myriad resource management systems belonging to different owners without increasing complexity. Thus, a new approach that decouples service management at run-time from the underlying distributed resource management systems (which are often non-communicative and cumbersome) is in order.

The present invention utilizes a new computing model in which a parallel signaling network overlies a net of self-managed von Neumann computing nodes to mplement dynamic fault, configuration, accounting, performance, and security management of both the nodes and the network in which they exist, based on business priorities, workload variations and latency constraints. This revision to conventional programming, computing and management models fundamentally alters the way in which applications and service transactions in a distributed computing environment are monitored and managed. In one embodiment, a "cognitive container" provides application self-awareness, self-management and self-control at run-time using a meta-model that captures the intent of the application.

To better understand this concept, consider that computer software is, generally, one or more algorithms implemented as one or more Turing machines using a serial von Neumann stored program control computing model. All general purpose computers are Turing machines executing a specified algorithm and a network of communicating Turing machines is equivalent to single Turing machine. While a Turing machine using the serial von Neumann stored program computing model executes instructions (read, compute and write functions), it lacks any knowledge of the intent of the algorithm to which those instructions belong (which intent is, presumably, known to the programmer) and the computing resources required to successfully execute that intent (known, presumably, to the system administrator or DevOps). For example, while executing instructions, if existing storage or computing resources are inadequate, the software will fail to execute, but the Turing machine performing the execution will not know this will occur until it in fact does occur. The intent compliance and resource monitoring and management functions are, thus, external to the execution of the Turing machine and are often performed by external agents such as administrators or other Turing machines implementing the required actions. This leads to ad-hoc approaches to the management of the intent, safety and survival of the software using managers of managers.

The cognitive container changes the above-described computing model by:

Introducing a meta-model of the software that is executed as a Turing machine. The meta-model uses the knowledge of the programmer (captured in a template) that represents context, constraints, control commands at run-time and communication behavior. The non-functional requirements are captured as policies, with information to install and assure availability of resources, performance to meet fluctuating workloads and security at run-time.

Introducing parallel Turing machines that configure, monitor and manage fault, configuration, accounting, performance and security policy compliance at run-time (self-awareness).

Introducing a policy-based mechanisms that influences read and write instructions of the Turing machine at run time (self-control).

Providing a signaling overlay network on the Turing machine network to configure, monitor and manage a group of applications delivering a service transaction (self-reasoning).

The templates used by the meta-model of the software are defined so as to capture requirements for provisioning the resources utilized by the software, processes required for installation, execution, monitoring of functional and non-functional behavior of the software and control of the software at run-time, using the signaling overlay network to deliver the intent of the application to the computing resources. For example, if a "heart beat" is not received by the management overlay of any particular application, a policy-based process may be executed to start the application elsewhere. Or, if response time for an application is greater than a predetermined threshold, instances of that application may be replicated at other computing resources to share the workload. Also, security keys can be defined to examine every read and write at a file and/or device level to determine whether the operation should be allowed.

Each cognitive container is provided a unique identifier, independent of any compute resource identifier (such as an IP address) and the signaling overlay network allows for the organization of cognitive containers into networks and sub-networks, each with their own unique identifiers.

In the context of network security, the use of the cognitive container facilitates the decoupling of service security management from resource provider-managed security systems (e.g., datacenter network security processes implementing firewalls and virtual private networks, datacenter server-based intrusion detection systems, cloud-provided virtual server network management services and virtual machine intrusion detection systems, packet sniffers and security managers, etc.), while still permitting end-to-end service transaction security. For example, a parallel security thread monitoring an application running in a cognitive container can be instantiated to implement various security policies such as: allowing the cognitive container provisioning and access based on proper authorization, authentication and accounting; implementing key-based security for selected file and/or device reads and writes at run-time based on key management provided over the signaling overlay network independent of server security and network security policies and processes; implementing a single-sign on among a group of cognitive containers (e.g., a network of cognitive containers); implementing security monitoring processes in the cognitive container using parallel security process and managing security of cognitive container networks using the signaling overlay, etc.

In this example, cognitive container security is independent of the security policies implemented in servers and physical networks (e.g., IP-based virtual private networks). Cognitive container security is implemented using the signaling overlay network to manage a network of cognitive containers, each with their own addressing, alerting, supervision and mediation abstractions. Security is implemented at the cognitive container level and at the application file and/or device read/write transaction level, and not at the network (e.g., IP) layer. The security implementation is thus independent of datapath protocols and physical network infrastructure; end-to-end service security visibility and compliance are provided using local operating systems that execute the service components. Of course, cognitive containers find roles in many other service transactions and the application of same to the network security problem is merely one example of their use.

A cognitive container, according to an embodiment of the present invention, is a software construct that is infused between an application (e.g., a compiled set of processor-executable instructions) and an operating system that provides the resources to execute the application at run-time. FIG. 1 illustrates an example of this arrangement. A computing resource 100 (e.g., a computer system, network of computer systems, etc.) includes a number of hardware resources 140 which are exposed to software applications 110a-110n via an operating system 130. In the case of a virtual machine, the operating system may be a hypervisor and the applications may be operating systems on which other applications execute. Infused between one or more of the applications 110a-110n and the operating system 130 are cognitive containers 120a-120m. In general a cognitive container 120 is unique to an application 110, or even unique to a thread of an application, but in some instances a single application may be associated with multiple cognitive containers (e.g., a network of cognitive containers) and a single cognitive container may be associated with more than one application (or thread). Within this arrangement, a cognitive container 120 enables service virtualization utilizing computing, networking and storage resources across physical devices, datacenters and geographical locations, independent of resource management systems. More particularly, a cognitive container uses an autonomic computing model that includes:

- policy-based interrupts at run-time;
- run-time parallel monitoring and management components; and
- a signaling overlay network to coordinate computing workflows at run-time.

Figure 2:
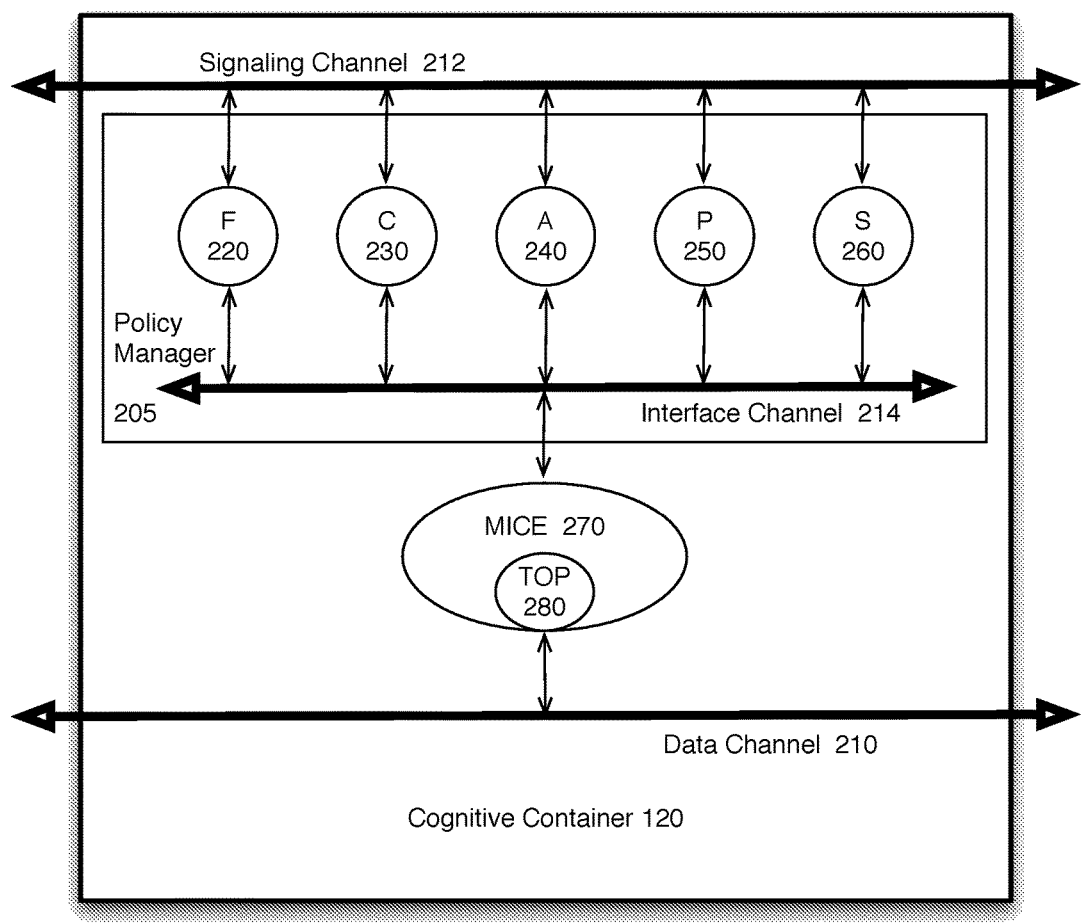
FIG. 2 illustrates an example of a cognitive container according to an embodiment of the present invention.

Referring now to FIG. 2, in its simplest form a cognitive container 120 is comprised of a policy manager 205, with separate elements for determining fault 220, configuration 230, accounting 240, performance 250, and security 260 aspects (often denoted by FCAPS) that are interconnected by an interface channel 214; a managed intelligent computing element (MICE) 270; and two communication channels, a signaling channel 212 and a data channel 210. MICE element 270 comprises a program that has the capability to load and execute a task oriented program or TOP 280. The FCAPS elements of the cognitive container provide setup, monitoring, analysis and reconfiguration based on workload variations, system priorities based on policies and latency constraints. They are interconnected and controlled using a signaling channel which overlays a computing channel that provides input/output connections to the MICE. The cognitive container acts like a Turing O-machine and circumvents Gödel's halting and un-decidability issues by separating the computing element and its management, pushing the management to a higher level. In this model, the controlled computing element (the MICE) acts as a conventional Turing machine and the FCAPS elements act as the Oracles.

There are three key modifications to the Turing machine which provide the abstractions required to provide the cognitive system attributes identified herein:

1) The "read->compute->write" instruction cycle of the Turing machine is modified to be "interact with external agent-22 read->compute->interact with external agent->write" instruction cycle, which allows the external agent to influence the further evolution of computation.
2) The external agent consists of a set of parallel managers monitoring and controlling the evolution of the computation based on the context, constraints and available resources. The context, constraints and control options are specified as a meta-model of the algorithm under computation. Here, context refers to local resource utilization and the computational state of progress obtained through the interaction with the Turing machine. Each cognitive container includes a service regulator (policy manager 205) that specifies the algorithm context, constraints, communication abstractions and control commands that are used to monitor and control the algorithm execution at run-time, and an algorithm executable module (MICE 270) that can be loaded and run in the cognitive container.
3) In addition to read/write communication of the Turing machine, the managers communicate with external agents using a parallel signaling channel. This allows the external agents to influence the computation in progress based on the context and constraints just as an Oracle is expected to do. The external agent itself could be another cognitive container, in which case changes in one computing element could influence the evolution of another computing element at run time without halting its Turing machine executing the algorithm.

The separation of computing and its management at the cognitive container may be extended and scaled to become a two layer cognitive container network. The cognitive container network thus provides a regulatory (or signaling) network overlay over the computing network.

A cognitive container infused between an application and an operating system thus provides independence of application/service management from the myriad resource management systems in use today, thereby providing service scalability across physical devices (virtualized or not), geographies and service providers. This eliminates the need for virtual image management and hypervisor orchestration software. Each cognitive container uses the local operating system to monitor the application executing within the container (e.g., processor performance, memory utilization, network bandwidth, latency, storage capacity, IOPs and throughput, etc.) at run-time in real-time at policy-defined intervals (e.g., using operating system commands such as iostat, netstat, etc.). Since the operating system isolates the monitoring from the server, network and storage management systems, the cognitive containers become self-monitoring independent of whether they are instantiated in a physical server or virtual server, or in a datacenter or a cloud. Further, when the currently available resources are deemed to be inadequate for execution of the application, the policies implemented using the signaling overlay network allow for preservation of the application's state and subsequent stateful replication of the application elsewhere where the required resources are available.

By infusing cognition in a distributed computing environment, the present invention provides application thread affinity, context-sensitive communication, cognitive cloud services and cognitive security at the level of a processor core. For example, the performance and configuration monitors in the cognitive container allow for monitoring of processor utilization on each core inside a central processing unit (CPU) through the associated operating system. The information obtained via such monitoring can be used to decide how best to utilize the available cores to serve the applications that are executing on the CPU. This reasoning may be reflected in the form of policies. For example, if a particular application is processor intensive and has higher business priority, then the configuration element of the cognitive container can ensure that application is run on a dedicated core without being swapped through appropriate operating systems commands at run-time. Similarly, policies based on CPU utilization data and available cores may be used to load balance workloads evenly across the available cores. The monitoring of data and control of resources using local operating system highlight an important advantage of the present invention. In effect, the cognitive container allows for the infusion of sensors and actuators within a Turing machine. The meta-model and service intent provides the knowledge that is required to reason and act. This allows for the implementation of the autonomic computing model of reasoning on Turing machines.

In one embodiment of the invention, a management platform, the distributed cognitive transaction platform, or DCTP, exploits the above-described features with both existing operating systems and a cognitive operating system to optimize computing device performance and security. The capabilities of the cognitive container allow its infusion in any computing device and it can be embedded in servers, mobile devices, networks, storage devices, and other machines. The DCTP (one example of which is a user application implemented in Java running on an operating system) has three components: a policy manager, a signaling manager and a softswitch.

The policy manager, which executes the FCAPS processes that read the meta model (containing the "blueprint" for configuring the required resources), load and execute the policies for the cognitive container and load and execute the application. The FCAPS managers provide the monitoring and control of the available computing resources based on policies. These managers communicate with their managers using the signaling channel. The configuration manager provides all the control commands to manage the application process based on policies and communication from other managers inside and outside the cognitive container.

The signaling manger provides alerting, addressing, supervision and mediation management of cognitive containers that are specialized as managers. These managers are responsible for cognitive container network (sub-network) management. For example, a service at the enterprise level may be composed of a number of services at the datacenter level, which may be composed of multiple servers in which multiple cognitive containers execute the service components. A service thus is decomposed hierarchically to sub networks of cognitive containers. All managers manage the sub networks under their domain. At the leaf level, workers execute the applications that contribute to the service transaction. The managers implement policies downstream and obey instructions from above.

The softswitch is a proxy that sits between the application and the operating system and maps (i.e., switches) all application file/device requirements to operating system file/device allocations. The connection is policy based and can be changed at run time because before each read or write, the switch checks to see if the policy has changed. If no policy change was made, the data path is not interrupted. If there was a policy change, the switch changes the connection between application and the operating system configurations. For example, at run time a write on a file or device (e.g., stdout) can be redirected to another file or device in any other cognitive container-based application.

Consider a simple example: Assume there exists a service component (instantiated as a cognitive container) called CAT. CAT is a function that displays whatever is typed in stdin on stdout. CAT runs on OS (an operating system). The goal is to create a service CHAT that uses instances of CAT but provides for changes to stdin and stdout at run time so that inputs from other files/devices and outputs to other files/devices can be ordered via appropriate commands.

To create the CHAT service, one instance of CAT is instantiated on platform 1. In its native configuration, if no policy changes are made, CAT will run in a mode that allows inputs at stdin to be displayed at stdout. This essentially is a console mode. A second instance of CAT is instantiated on platform 2. Like the instance of CAT on platform 1 (CAT1), the instance of CAT on platform 2 (CAT2) will run in a console mode so that inpits at stdin will be displayed at stdout. The CHAT service now requires that a manager be introduced to control the operation of the two instances of CAT at the two different platforms. The manager, a DCTP, includes FCAPS elements to provide, among other things, control of the two CAT instances based on policies. The DCTP communicates with the CAT instances via a signaling channel that is separate from a data channel that will be established between the CAT instances when operating as CHAT. To accomplish that operation, the CHAT DCTP instructs CAT1 to connect (via the data channel) its stdin to the stdout of CAT2. Likewise, CAT2 is instructed to connect (via the data channel) its stdin to the stdout of CAT1. A security password may be implemented so that each CAT must first check with the DCTP to determine whether a policy change has been made before accepting an input from the other CAT's stdin. The monitoring element of the DCTP ensures that the two instances of CAT remain up and if one is detected as having failed (e.g., by the absence of a heart beat signal), the DCTP will instruct another instantiation of a CAT to replace the failed one.

Thus, individual cognitive containers may be used to embed self-awareness, reasoning and control within an application and a group of such containers may be used to deliver service transactions with specific quality of service (QoS) constraints (e.g., visibility at run-time, self-repair, auto-scaling, performance optimization, end-to-end security, etc.). These services may be provided either on physical or virtual machines. In some embodiments, a proxy architecture may be used to implement the cognitive container (and its monitoring and control) to provide run-time application management without changing the application (or recompiling it), the operating system, or the infrastructure (e.g., a server, network and/or storage devices being used by the application).

As should now be evident, a cognitive container operates recursively, uses monitored data to compare its current behavior to expected behavior and communicate with other cognitive containers using an overlay signaling message bus (e.g., thereby establishing a control plane for applications to be managed). The signaling allows cognitive containers to exchange control information to change the behavior of an application under execution at run-time. For example, policy management may be implemented using a meta-model of the functional and non-functional attributes and behavior of the group of applications. Likewise, a group of cognitive containers can be recursively managed to provide group level policy management.

The application under execution is illustrated in FIG. 2 as MICE element 270. As explained above, MICE 270 comprises a program that has the capability to load and execute TOP 280. TOP 280 is a program written to accomplish a specific computational task by operating on input data. Completion of the computational task performed by the TOP results in output data necessary to the desired performance of some portion of a host. Examples of hosts include, but are not limited to, applications, computer systems, distributed computing networks, and so on. Examples of computational tasks that the TOP may perform include, but are not limited to, sorting lists, backing up data, preparing reports, causing the reading or writing of data from or to a data storage device, transferring data from one storage device to another, and controlling computational tasks of the TOPs of other interconnected cognitive containers. Other capabilities instantiated into the MICE 270 include, but are not limited to deleting, configuring, or re-configuring the TOP.

The TOP is loaded into the MICE 270 and may be so loaded, executed, deleted, configured, or reconfigured according to commands sent to the MICE 270, for example from the C element 230. The commands are sent in response to the appropriate communication signals received by the C element 230 via the signaling channel 212 (e.g., from higher layer managers or from other elements of policy manager 205). The TOP 280 may be loaded into the MICE 270 at instantiation of the MICE, or the TOP may be loaded into the MICE at some time after its instantiation. The TOP in MICE 270 may be closed and another TOP loaded into the MICE 270. Alternatively, the TOP in MICE 270 may be reconfigured to produce a different output, according to commands received by the MICE 270 from the C element 230.

The F element 220 is a program that monitors the elements of policy manager 205 for errors. F element 220 maintains a log of error messages and makes the error messages available to other cognitive containers via the signaling channel 212. In addition, the F element 220 sends out a periodic heartbeat signal to the other cognitive containers via the signaling channel to indicate that it continues to monitor for error messages.

The C element 230 is the configuration element that manages the configuration and re-configuration of the MICE 270. It receives command messages via the signaling channel and sends the appropriate configuration commands to the MICE 270 via the interface channel 214. The commands can cause the MICE 270 to perform a number of different functions. These functions include, but are not limited to, loading a specific TOP, executing the TOP, changing the operating polices of the loaded TOP, stopping or re-starting the execution of the loaded TOP. Messages from the C element 230 also include addressing commands which specify the addresses which locate the input data and the address or addresses to which the results of the execution of the TOP in the MICE 270 are to be sent.

The A element 240 is an auditing and accounting element. The A element 240 monitors the utilization of the policy manager elements and each such element sends information to the A element 240 identifying the origin, type and time duration of the utilization of the element. The A element 240 logs the information and may sends the logged information to a storage device (e.g., a storage device accessible to the host system) for later use, including but not limited to its use for billing purposes.

The P element 250 is the performance element, which monitors the use of resources by each of the cognitive container elements 220, 230, 240, 250, 260 and 270. The resources may include computing cycles, memory, storage throughput, network bandwidth. Monitoring of the MICE 270 by the P element 250 includes monitoring the usage of the resources by the TOP 280. The P element creates a log of the information, and sends the logged information to a storage device where it is stored and may be used, for example, to optimize the usage of the network resources.

The S element 260 is the security element, which executes security protocols for securing the communication, command and control messages flowing into and out of the cognitive container elements 220, 230, 240, 250, 260, and 270. In addition, the functions of the S element 260 include, but are not limited to authentication of data flowing into and out of the cognitive container, and establishing and managing secure communication channels to and from the cognitive container, comprising those based on various encapsulation and encryption technologies.

A Workflow may be regarded as a set of one or more cognitive containers 120 within a network. A MICE 270 of each cognitive container 120 in the set may be programmed so that its TOP 280 executes in coordination with respect to the execution of the other TOPs of the cognitive containers in the set. Such coordinated cognitive container executions comprise multiple cognitive container executions of one or more cognitive containers in a Workflow, either in succession or separated by the cognitive container executions of other cognitive containers in the Workflow. In addition, the coordinated executions may have cognitive container executions taking place in series or parallel combinations.

The purpose of a Workflow is to achieve a certain outcome that requires the coordinated cognitive container execution of the cognitive containers in the Workflow. Inclusion of the S element 260 in a cognitive container 120 enables security protocols to be implemented at the most basic level of a cognitive container network and of a cognitive container Workflow. The implications for network design include, but are not limited to, providing unique levels of security to each cognitive container in a Workflow. This is accomplished by programming each cognitive container's S element with unique security protocols. By providing a mechanism for customization of data security at all levels of a distributed computing network, the present invention enables greatly improved network security when compared with current distributed computing security techniques.

One or more of the methods or processes described herein may be executable on various computer-based devices. Such devices may include any electronic device capable of performing the actions described above (using suitable programming) and, where applicable, processing the information for display so as to properly convey the information. Examples of such devices include desktop computers, laptop computers, cellphones, smart phones, tablet computers, computer game consoles, portable computer gaming consoles, media players, portable media players, other mobile devices, and the like.

In such devices, a processor may control the overall functions of the electronic device such as running applications and controlling peripherals. Such a processor may be any type of processor and may communicate with an RF receiver and RF transmitter to transmit and receive wireless signals (e.g., via an antenna) such as cellular, Bluetooth, Wi-Fi, WiLAN, or other communication signals. The processor may use short-term memory to store operating instructions and to help in the execution of the operating instructions (e.g., such as the temporary storage of calculations and the like). The processor may also use non-transitory storage to store and read instructions, files, and other data that requires long term, non-volatile storage.

The processor may communicate and control other peripherals, such as a display with associated touch screen sensor, causing images to be displayed on the display and receiving input from the touch screen sensor when a user presses on the touch-screen display. In some examples, a touch screen sensor may be a multi-touch sensor capable of distinguishing and processing gestures.

The processor may receive input from a physical keyboard. In other examples, the device may utilize a touch screen keyboard using the display and touch screen sensor. The processor may produce audio output and other alerts that are played on a speaker. A microphone may be used as an input device for the processor to receive commands using voice-processing software.

An accelerometer may provide input on the motion of the device to the processor. An accelerometer may be used in motion sensitive applications, or, for example, in connection with scrolling content using tilting gestures, etc. A Bluetooth module may be used to communicate with Bluetooth-enabled external devices. A USB port may enable external connections to other devices (e.g., mice or other cursor control devices) supporting the USB standard and charging capabilities. An external storage module may include any form of removable physical storage media such as a flash drive, micro SD card, SD card, Memory Stick, and the like.

Certain embodiments are described herein as including logic or a number of components, modules, or mechanisms. Modules or components may constitute software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors, including processor 98, may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the processor or processors may be located in a single location, while in other embodiments the processors may be distributed across a number of locations.

The one or more processors may also operate to support performance of the relevant operations in a "cloud computing" environment or as a "software-as-a-service" (SaaS) service. For example, at least some of the operations may be performed by a group of computers (as examples of machines including processors), with these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. For example, the code can be stored on one or more non-transitory, or non-volatile tangible computer-readable media, and may be loaded into volatile media during execution or at other times (e.g., during a transfer between storage devices, etc.). Examples of these tangible computer-readable media can include, but are not limited to, hard disks, removable magnetic disks, removable optical disks (e.g., compact disks and digital video disks), magnetic cassettes, memory cards or sticks, read only memories (ROMs), flash memories or other solid state devices (SSDs) and the like.

What is claimed is:

1. An method of executing a computer-implemented process, comprising:
   a processor and a memory communicably coupled to the processor, the memory storing processor-executable instructions, which instructions when executed by the processor cause the processor to instantiate a computer-implemented process, comprising:
   loading, by a processor from a memory storing processor-executable instructions that comprise the computer-implemented process and that is communicably coupled to the processor, a task oriented program concerning a managed computing element, said task oriented program including a plurality of task-oriented processor-executable instructions;
   executing, by the processor, the task oriented program; and
   closing, by the processor, the task oriented program;
   wherein during execution of the task oriented program, one or more elements executed by the processor determine faults, configuration, accounting, performance, and security aspects of the managed computing element via an interface channel, the managed computing element receives inputs and provides outputs to a host via a data path that is accessible to the managed computing element; and the one or more elements exchange management information with service transaction management elements via a signaling path separate from the data path, the service transaction management elements being distinct from infrastructure management systems for said host.

* * * * *